UNITED STATES PATENT OFFICE 2,046,556

TREATMENT OF UNSATURATED OXYCOMPOUNDS

Herbert P. A. Groll, Oakland, and George Hearne, Berkeley, Calif., assignors to Shell Development Company, San Francisco, Calif., a corporation of Delaware No Drawing. Application April 23, 1934, Serial No. 721,976

23 Claims. (Cl. 260—138)

This invention is concerned with the conversion of unsaturated oxy compounds to valuable products and is more particularly concerned with heating a compound or compounds of the class consisting of unsaturated alcohols, ethers and esters with an acid or acid acting catalyst in a liquid system, whereby carbonylic compounds can be obtained.

The present invention provides a process for the conversion of unsaturated hydroxy compounds to carbonylic compounds in an anhydrous liquid system comprising said hydroxy compound and an organic solvent in which an acid or acid acting conversion catalyst is dissolved. Another advantage of the present invention resides in a process for the conversion of unsaturated ethers and esters to valuable products by heating said ether or ester with an acid or acid acting catalyst in a liquid system which may comprise a suitable organic solvent for said catalyst and/or water.

The preferred unsaturated monohydric and polyhydric compounds such as unsaturated alcohols, glycols, halohydrins, etc. to which our method is applicable may be represented by the formula

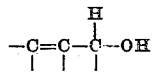

wherein the loose bonds may be taken up by hydrogen, halogen, hydroxyl, alkyl, alkoxy, carbocyclic, heterocyclic, aralkyl, aralkoxy groups and/or other suitable organic radicals or monovalent substituents which may or may not be further substituted; it being understood that a carbinol carbon atom is not linked to a halogen atom or to another hydroxyl group. Another group of preferred unsaturated hydroxy compounds is represented by the formula

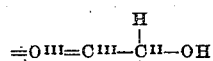

wherein at least one of the $C^{III}$ carbon atoms is tertiary, that is, linked to three other carbon atoms. The carbon atom represented by $C^{II}$ may be either of primary or secondary character. The alcohols of this series include, among others, compounds such as

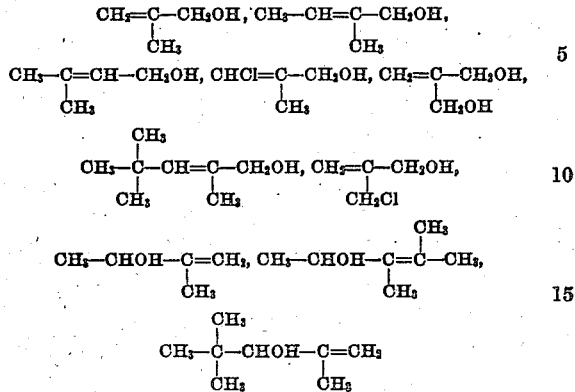

and the like and their analogues, homologues and substitution products.

The unsaturated alcohols containing an unsaturated tertiary carbon atom are particularly adaptable to treatment according to the principles inherent in our invention, whereby conversion of the unsaturated alcohol to the corresponding carbonylic compound is readily and economically effected.

When an unsaturated alcohol which does not possess an unsaturated tertiary carbon atom such as allyl alcohol and its homologues is treated in a substantially anhydrous system comprising the alcohol and an acid or acid acting catalyst dissolved in a carboxylic acid, we have found that no rearrangement occurs due to the fact that under the conditions described such alcohols behave in a manner similar to saturated alcohols in that they are readily and substantially completely esterified. In aqueous systems, these alcohols may be rearranged to carbonylic compounds but the reaction occurs at a much slower rate and less completely than when an alcohol containing an unsaturated tertiary carbon atom is reacted under identical conditions.

Unsaturated primary alcohols form aldehydes, aldols, substituted aldehydes, substituted aldols, etc. by molecular rearrangement. The products of the molecular rearrangement of unsaturated secondary alcohols are ketones, ketols, substituted ketones, substituted ketols, etc., depending on the molecular structure of the specific alcohol undergoing rearrangement.

In the majority of cases, when an unsaturated alcohol of the type herein described is molecularly rearranged, the resulting reaction product is a carbonylic compound which is saturated and isomeric to the alcohol reacted. We have, however, found that if a γ-halogen or γ-hydroxyl substituted unsaturated alcohol, ether or ester of the type described is treated, a secondary elimination of hydrogen halide or water occurs and unsaturated carbonylic compounds are obtained instead of the β-hydroxy- or β-halo-carbonylic compounds. For example, the compounds

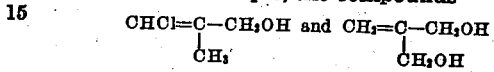

do not rearrange to form the respective chloroaldehyde

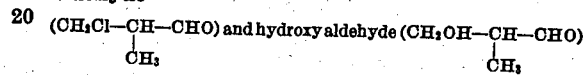

but instead split off respectively hydrogen halide and water whereby methyl acrolein

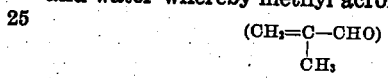

is directly obtained. We have observed that when a gamma substituted halo or hydroxyl unsaturated alcohol, ether or ester is treated by our process it is not necessary that we employ a solvent for the acid acting catalyst.

As an organic solvent for the catalyst employed we may use any organic compound which exists as a liquid under the temperature and existing pressure of operation, which is capable of dissolving said catalyst and which permits rearrangement of the treated unsaturated alcohol, ether or ester in a liquid system. For example, we may use alcohols as methyl, ethyl, propyl, isopropyl, butyl, isobutyl, secondary butyl, tertiary butyl, amyl and the like, or we may use cyclic hydroxy compounds as phenols, cresols, naphthols, etc. When aliphatic alcohols are employed, the primary lower alcohols as methyl and ethyl are the most suitable since they are more resistant to conversion to ethers, olefines, etc. than the higher primary, secondary or tertiary alcohols. The most generally suitable organic solvents were found to be liquid organic acids, particularly those possessing a relatively low viscosity. Suitable organic acids which may be employed include among others formic, acetic, propionic, butyric, isobutyric, valeric and the like and suitable homologues, analogues and substitution products. We prefer to employ organic acids containing from 2 to 5 carbon atoms to the molecule. The organic solvents may be used singly or in solution with each other.

When executing our invention with unsaturated alcohols, we prefer to effect the rearrangement of said unsaturated alcohol in an anhydrous liquid system comprising said alcohol and an acid acting catalyst dissolved in a suitable organic solvent. When it is desired to convert an unsaturated ether or ester to a carbonylic compound, the reaction may be effected in a liquid system comprising water, acid acting catalyst and said unsaturated ether and/or ester, or may be effected in a liquid system comprising said unsaturated ether and/or ester, an acid acting catalyst, a suitable organic solvent or solvents and varying amounts of water.

The unsaturated compounds which may be treated in accordance with the principles of our invention are the nonvinylic unsaturated alcohols and their ethers and esters which contain an unsaturated alkyl chain linked, respectively, to the ether oxygen atom or to the oxygen atom of the carboxylic ester group by a saturated carbon atom. The other radical linked to the ether oxygen atom or to the carbon atom of the carboxy group may be the same or different, be saturated or unsaturated, and may be linked thereto by a saturated or unsaturated carbon atom.

The class of unsaturated oxy compounds may be represented by the general formula R—O—X, wherein R represents an organic radical linked to the oxygen atom by a saturated carbon atom and containing an olefinic linkage between two aliphatic carbon atoms, and X represents hydrogen, an organic radical which may be the same or different than R, or the group

wherein R' represents hydrogen or an organic radical linked to the carboxy group by a carbon atom. The unsaturated ethers may be symmetrical or asymmetrical. An unsaturated ether, when treated by our method, apparently splits at the ether bond and a carbonylic compound corresponding to the unsaturated alkenyl radical and an alcohol corresponding to the other radical is obtained. In the case that both of the ether radicals are unsaturated and attached to the same oxygen atom by saturated carbon atoms, the rearrangement product may be a mixture of two species of carbonylic compounds. One mol of a symmetrical unsaturated ether will be substantially converted to two mols of the corresponding carbonylic compound. If an unsaturated ester is rearranged by our method, the ester apparently splits at the carboxylic bond and a carbonylic compound corresponding to the unsaturated alkenyl radical and an equivalent amount of the corresponding acid are obtained as products. Mixtures comprising unsaturated alcohols, ethers and esters may be treated and mixed products obtained. By some methods of preparation of unsaturated alcohols, the alcohol is obtained in a mixture with the corresponding symmetrical unsaturated ether. Such a mixture may be rearranged and substantially completely converted to a valuable carbonylic compound. It is to be understood that the alkenyl radical may be linked to alicyclic, aromatic, and heterocyclic radicals while the other ether radical or acid radical may be of aliphatic, aromatic, aralkyl or heterocyclic or the like character.

As the catalyst for the rearrangement we may use a suitable acid, acid salt, acid reacting substance or substance capable of acting as an acid catalyst under the conditions of operation and in contact with the reactants, solvents, etc., in the reaction mixture. Suitable catalysts which may be employed are the strong mineral acids such as $H_2SO_4$, $H_3PO_4$, $H_2S_2O_7$, $HPO_3$, $HCl$, $HBr$, $H_4P_2O_7$, $HClO_3$, $HClO_4$, $HNO_3$, and the like, or mineral acid constituents such as $SO_2Cl_2$, $SOCl_2$, $SOBr_2$, $NO_2$, $N_2O_3$, $NOCl$, $POCl_3$, $PCl_3$, $PCl_5$, and the like compounds. We may also employ the acid salts of polyvalent mineral acids which still contain at least one ionizable hydrogen and are of strongly acid character such as $NaHSO_4$, $ZnH_2(SO_4)_2$, $NaH_2PO_4$ and the like. We may, when it is desired, employ organic esters, salts and compounds capable of acting as strong acid catalysts under the conditions of operation such as benzene sulphonic acid and its homologues and analogues, dialkyl and acid alkyl sulphates, alkylated phosphoric and sulphonic acids, halogenated organic acids, acids as sulpho-acetic, etc., acid halides and compounds such as aniline-hydrochloride, etc. We have found that when unsaturated alcohols containing an unsaturated tertiary carbon atom are treated we may, due to the greater ease of conversion of this class of alcohols, employ catalysts which are acid acting but weaker than the above described acidic or acidic acting compounds generally applicable. For example, we may successfully employ the salts of strong acids and weak bases such as ZnSO₄, ZnCl₂, ZnBr₂, FeCl₃, FeBr₃, AlCl₃, CoCl₂, NiCl₂, Fe₂(SO₄)₃, Al₂(SO₄)₃ and the like.

The catalytic power of the catalyst is dependent on its acid strength. The weaker the acidity of the catalyst employed, the lower is its catalytic power. Accordingly, all other conditions being the same, the use of a weaker acid catalyst ordinarily requires its application in higher concentrations or necessitates the use of higher operating temperatures in order to obtain the same degree of catalytic activity. In a preferred mode of execution of our invention whereby unsaturated alcohols are treated under substantially anhydrous conditions, we prefer to use sulphuric acid dissolved in an organic acid such as acetic, propionic, isobutyric and the like. Substantially all of the alcohol may be, in this manner, converted in the presence of sulphuric acid in amounts up to about 0.5%. When unsaturated ethers or esters are treated, we may use aqueous solutions of sulphuric acid the preferred concentration being between about 10% to 15%. With sulphuric acid in concentrations exceeding 20% calculated as H₂SO₄, heavy polymerization losses were experienced.

We have found that the rearrangement of unsaturated alcohols, ethers and esters proceeds substantially in a liquid system, and that there it can be made to proceed smoothly without the substantial formation of undesirable by-products. If two liquid phases are present, the rearrangement occurs predominantly in the phase containing the acid acting catalyst in solution, while in the other or non-solvent phase, which phase will comprise principally the reactant and reaction products, side reactions between reactant and product may occur, resulting in polymerization and condensation products. Mere agitation or emulsification of the two phases is not sufficiently effective in preventing the occurrence of side reactions.

To avoid side reactions, we preferably operate under such conditions which preclude the formation of a second liquid phase. To accomplish this, we may charge into a reaction vessel the required quantity of acid acting catalyst dissolved in a suitable organic solvent, together with as much of the unsaturated oxy compound to be rearranged as can enter into homogeneous solution with the catalyst solvent at the temperature and existing pressure of operation. As the reaction proceeds and a carbonylic compound is formed, the homogeneous solution becomes saturated with the carbonylic compound. Any further formation of carbonylic compound would result in the formation of a second liquid phase. We prefer to prevent the formation of said second liquid phase by the following mode of procedure which is applicable to cases where the boiling temperature of the reaction product or of its constant boiling mixture comprising any of the other substances which may be present is lower than the boiling temperature of the reaction mixture. In this case, by keeping the pressure in the reaction vessel below the vapor pressure of the carbonylic compound at the reaction temperature, we can cause the carbonylic compound to evaporate as soon as it separates as a separate phase from the solution saturated with it. By a further lowering of the pressure on the system, we may cause part of the carbonylic compound in the homogeneous solution to evaporate, thus obviating any tendency for its accumulation in the system.

The carbonylic compounds are readily recovered by condensing the vapors removed from the reaction vessel. The condensate which may also contain unreacted unsaturated oxy compounds and solvent material as water, organic acid, etc. may be distilled, the carbonylic compound recovered and the separated substances conducted back to the reaction vessel for reutilization therein.

In accordance with the above described method, it may be desirable to arrange the distilling or fractionating apparatus in communication with the reaction vessel in such a manner that the vapors from the latter are directly conducted into a suitable portion of the distilling column. In this case, the carbonylic compound or a constant boiling mixture comprising carbonylic compound and one or more of the constituents of the reaction solution may be fed to the top of the distilling column or columns as reflux, the carbonylic compound is recovered as distillate and the other constituents as reactant, organic solvent, and in some cases, water may be returned to the reaction vessel.

In a continuous mode of operation, the concentration of the unsaturated alcohol, ether or ester in the reaction vessel may be kept up by the admission of the reactant to it at approximately the same rate at which is is consumed by rearrangement and removed by distillation. The reactant may be introduced near the bottom of the rearrangement vessel by any suitable means such as a porous disc, liquid injector, perforated tube and like means. Agitation of the reaction mixture is advantageous since it materially enhances the rate of solution of the introduced reactant. The unreacted unsaturated alcohol, ether or ester separated from the carbonylic compound in the fractionating apparatus may be fed into the reaction vessel independently or in conjunction with the main bulk of reactant introduced.

In certain cases, particularly when hydroxy carbonylic compounds such as aldols and ketols are formed, the product may be considerably soluble in water, the organic solvent employed or a solution of the two. In such a case, we prefer to extract the product from the reaction mixture by means of suitable solvents. The collected layer or the extract may be removed, and from it, preferably by distillation, we may obtain the product in the desired purity. Unchanged reactant material contained in the mixture is recovered and returned to the reaction vessel.

Suitable arrangements of heat exchanging devices may be provided for cooling the saturated liquid before entering the separator and utilizing its heat content for heating the lean liquid being returned to the reaction vessel.

It will be apparent to those versed in the art, that our invention may be executed in a batch, intermittent or continuous manner. The main requirement of its successful operation is the maintenance of a liquid phase or phases in the reaction vessel. When some particular reactants are employed, it may be extremely difficult or undesirable to maintain a homogeneous liquid system. In this case, by working under superatmospheric pressure and resorting to correspondingly elevated temperatures, excellent yields may still be obtained as the rate of the rearrangement reaction may be increased to the extent that there is less time for polymerization and the like undesirable side reactions.

While the rearrangement can, in the majority of cases, be achieved by heating the reaction mixture at about its boiling temperature at atmospheric pressure, the optimum rearrangement temperature was found to be above said boiling temperature, depending on the character of the unsaturated alcohol, ether or ester, its concentration, its purity, the solvent employed, etc. To maintain the higher temperatures, pressures above atmospheric may be applied.

The unsaturated ethers and esters may be introduced to the reaction vessel containing varying amounts of water. Their constant boiling mixtures with water may be used as well as the substantially anhydrous compounds.

For purposes of illustration only, reference will be had to several examples setting out the mode of procedure when specific reactants are employed.

*Example I*

1 gram of concentrated sulphuric acid was dissolved in 150 gm. of glacial acetic acid and the solution placed in the kettle of a fractionating still. While the solution in the kettle was vigorously boiled, 50 gms. of anhydrous secondary isopentenol were slowly added.

The distillate was anhydrous methyl isopropyl ketone. The conversion of the unsaturated alcohol to its corresponding saturated isomeric ketone was practically quantitative.

*Example II*

1 gm. of concentrated sulphuric acid was dissolved in 150 gm. of isobutyric acid and the solution placed in the kettle of a still. While the liquid in the kettle was vigorously boiled, 50 gm. of anhydrous isobutenol were slowly added.

The distillate boiling at 64° C. to 65° C. was anhydrous isobutyraldehyde. Substantially all of the isobutenol was rearranged to isobutyraldehyde.

*Example III*

1 gm. of concentrated sulphuric acid was dissolved in 150 gm. of phenol and the solution placed in the kettle of a fractionating still. The solution was boiled while 50 gm. of anhydrous isobutenol were slowly admitted to the flask.

The distillate, collected in a range of about 60° C. to 65° C. was found to consist of isobutyraldehyde and water. The conversion to isobutyraldehyde was about 40%. The residue contained a hard brittle resin which was recovered by steam distillation, whereby the excess phenol was removed.

The use of cyclic hydroxy compounds as reaction solvents provides a means of producing valuable resinous condensation products of unsaturated alcohols and phenolic bodies. By a suitable adjustment of the reflux, the reaction can be regulated so that either a large part of the carbonylic compound is recovered as such or substantially all of it is combined with the cyclic hydroxy compound to form a resin.

*Example IV*

1 gm. of concentrated sulphuric acid was dissolved in 150 gm. of glacial acetic acid and 50 gm. of diisobutenyl ether

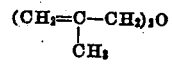

were slowly added to the boiling solution in a distilling apparatus.

The distillate was anhydrous isobutyraldehyde. The conversion was about 38%. Considerable polymerization occurred due to a deficiency of water for the complete hydrolysis of the ether. The water initially present had been introduced with the sulphuric and glacial acetic acids which were not completely anhydrous.

*Example V*

1046 gm. (8.3 mols) of diisobutenyl ether were fed at a rate of 1500 c. c. per hour into about 3 gallons of about 13% aqueous sulphuric acid solution contained in a lead lined autoclave equipped with means for effecting agitation and distillation under pressure of the contents. The temperature of reaction was maintained at about 125° C. under an existing pressure of about 20 lbs. per square inch (gauge). Distillate was collected at approximately the same rate as ether was admitted to the autoclave.

The operation was terminated when about 1046 gm. of ether had been admitted to the reaction vessel. The distillate was dried and refractionated. About 688 gm. (9.41 mols) of isobutyraldehyde and 322 gm. (2.55 mols) of unreacted diisobutenyl ether were recovered.

*Example VI*

A lead-lined still was charged with about 3.5 gallons of a 50% by weight aqueous solution of ethyl alcohol containing about 10% by weight of sulphuric acid. This mixture was heated to about 105° C. under the existing pressure. A mixture consisting of about 80% isobutenol, 10% diisobutenyl ether and 10% water was pumped into the reaction vessel at a rate of about 8 pounds of liquid per hour.

Isobutyraldehyde was withdrawn from the still head as an azeotrope with water at a rate corresponding to the rate of admission of the reactants. After about 6.25 hours of continuous operation a total of about 50 pounds of the isobutenol mixture had been admitted to the reaction vessel. The operation of the still was continued without further addition of reactants until no more aldehyde could be recovered.

The collected distillate was allowed to stratify and the two liquid phases separated. The nonaqueous phase was dried and refractionated. Isobutyraldehyde was obtained in a yield of about 97%.

*Example VII*

A mixture consisting of about 7 liters of water, about 3 liters of glacial acetic acid and about 1300 gm. of sulphuric acid was put in a lead-lined autoclave equipped with means for stirring and distillation of the contents under pressure. The autoclave contents were agitated and maintained at 125° C. while isobutenyl acetate was slowly admitted. Distillate was withdrawn from the autoclave at about the same rate as the ester was admitted.

The distillate was salted out, allowed to stratify and the liquid phase separated. The nonaqueous phase was dried and refractionated. A total of 1140 gm. of isobutenyl acetate was rearranged and 655 gm. of isobutyraldehyde was obtained. This represents a yield of about 91%.

*Example VIII*

1 gm. of sulphuric acid was dissolved in 150 gm. of isobutyric acid. This solution was placed in the kettle of a distilling apparatus and heated to its boiling temperature. 50 gm. of γ-chloro isobutenol of the probable formula $$CH_2=C-CH_2OH$$
$$|$$
$$CH_2Cl$$

was slowly introduced into the boiling solution.

The collected condensate was found to be methyl acrolein of the formula $$CH_2=C-CHO$$
$$|$$
$$CH_3$$

The conversion was about 93%.

By the term "mineral acid acting catalyst" as used in the accompanying claims we mean a catalyst which may be a strong mineral acid, the acid salt of a polyvalent mineral acid containing at least one ionizable hydrogen or and inorganic or organic substance capable of acting as a strong mineral acid under the conditions of operation and in contact with the reactants.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for the conversion of unsaturated oxy compounds to valuable products which comprises heating a compound of the class consisting of nonvinylic unsaturated alcohols and their ethers and fatty acid esters each containing an unsaturated alkyl chain linked to the oxygen atom by a saturated carbon atom with a mineral acid-acting catalyst in a liquid system containing a liquid organic solvent for said catalyst, said fatty acid esters being derived from lower fatty acids.

2. A process for the conversion of unsaturated oxy compounds to valuable products which comprises heating a compound of the class consisting of nonvinylic unsaturated alcohols and their ethers and fatty acid esters each containing an unsaturated alkyl chain linked to the oxygen atom by a saturated carbon atom with a mineral acid-acting catalyst in a liquid system containing water and a liquid organic solvent for said catalyst, said fatty acid esters being derived from lower fatty acids.

3. A process for the conversion of unsaturated oxy compounds to valuable products which comprises heating an unsaturated alcohol containing an olefinic linkage between two aliphatic carbon atoms with a mineral acid-acting catalyst in an anhydrous liquid system containing a liquid organic solvent for said catalyst at a substantially elevated temperature at which rearrangement of the unsaturated alcohol occurs at a practical rate.

4. A process for the conversion of unsaturated oxy compounds to valuable products which comprises heating a compound selected from the class consisting of nonvinylic unsaturated alcohols and their ethers and fatty acid esters each containing an alkyl chain which is linked to the oxygen atom by a saturated carbon atom and possesses an olefinic linkage between two aliphatic carbon atoms at least one of which is tertiary with a mineral acid-acting catalyst in a liquid system containing a liquid organic solvent for said catalyst, said fatty acid esters being derived from lower fatty acids.

5. A process for the conversion of unsaturated oxy compounds to valuable products which comprises heating a compound selected from the class consisting of nonvinylic unsaturated alcohols and their ethers and fatty acid esters each containing an alkyl chain which is linked to the oxygen atom by a saturated carbon atom and possesses an olefinic linkage between two aliphatic carbon atoms at least one of which is tertiary with a catalyst comprising a salt of a strong mineral acid and a weak base in a liquid system containing a liquid organic solvent for said catalyst, said fatty acid esters being derived from lower fatty acids.

6. A process for the conversion of unsaturated oxy compounds to valuable products which comprises heating an alcohol containing an olefinic linkage between two aliphatic carbon atoms at least one of which is tertiary with a mineral acid-acting catalyst in an anhydrous liquid system containing a liquid organic solvent for said catalyst.

7. A process for the conversion of unsaturated oxy compounds to valuable products which comprises heating a compound of the class consisting of nonvinylic unsaturated alcohols and their ethers and fatty acid esters each containing an unsaturated alkyl chain linked to the oxygen atom by a saturated carbon atom with a mineral acid catalyst in a liquid system containing a liquid organic solvent for said catalyst, at a substantially elevated temperature at which rearrangement of the unsaturated alcohol occurs at a practical rate, said fatty acid esters being derived from lower fatty acids.

8. A process for the conversion of unsaturated oxy compounds to valuable products which comprises heating a compound of the class consisting of nonvinylic unsaturated alcohols and their ethers and fatty acid esters each containing an unsaturated alkyl chain linked to the oxygen atom by a saturated carbon atom with a mineral acid-acting catalyst in a liquid system containing a liquid carboxylic acid as a solvent for said catalyst, said fatty acid esters being derived from lower fatty acids.

9. A process for the conversion of unsaturated oxy compounds to valuable products which comprises heating a compound selected from the class consisting of nonvinylic unsaturated alcohols and their ethers and fatty acid esters each containing an alkyl chain which is linked to the oxygen atom by a saturated carbon atom and possesses an olefinic linkage between two aliphatic carbon atoms at least one of which is tertiary with sulphuric acid in a liquid system containing said sulphuric acid dissolved in a liquid organic solvent, said fatty acid esters being derived from lower fatty acids.

10. A process for the conversion of unsaturated oxy compounds to valuable products which comprises heating a compound selected from the class consisting of nonvinylic unsaturated alcohols and their ethers and fatty acid esters each containing an alkyl chain which is linked to the oxygen atom by a saturated carbon atom and possesses an olefinic linkage between two aliphatic carbon atoms at least one of which is tertiary with sulphuric acid in an aqueous liquid system containing a liquid carboxylic acid, said fatty acid esters being derived from lower fatty acids.

11. A process for the conversion of unsaturated oxy compounds to valuable products which comprises heating an unsaturated alcohol containing an olefinic linkage between two aliphatic carbon atoms at least one of which is tertiary with sulphuric acid in a substantially anhydrous liquid system containing a liquid carboxylic acid as solvent for said sulphuric acid.

12. A process for the conversion of isobutenol to isobutyraldehyde which comprises heating isobutenol with a mineral acid-acting catalyst in a substantially anhydrous liquid system containing a liquid organic solvent for said catalyst.

13. A process for the conversion of diisobutenyl ether to isobutyraldehyde which comprises heating diisobutenyl ether with a mineral acid-acting catalyst in a liquid system containing a liquid organic solvent for said catalyst.

14. A process for the production of α-methyl acrolein which comprises heating a compound of the class consisting of gamma halogen and gamma hydroxyl substituted isobutenols with a mineral acid-acting catalyst in a liquid system containing a liquid organic solvent for said catalyst.

15. The reaction product obtained by heating a compound of the class consisting of nonvinylic unsaturated alcohols and their ethers and fatty acid esters each containing an unsaturated alkyl chain linked to the oxygen atom by a saturated carbon atom in an anhydrous system in the presence of a mineral acid-acting catalyst and a liquid organic solvent for said catalyst, said fatty acid esters being derived from lower fatty acids.

16. The reaction product obtained by heating a compound of the class consisting of nonvinylic unsaturated alcohols and their ethers and fatty acid esters each containing an unsaturated alkyl chain linked to the oxygen atom by a saturated carbon atom in an anhydrous system in the presence of a mineral acid-acting catalyst and a hydroxylated carbocyclic compound which contains a hydroxy group linked to a carbon atom in the nucleus and which is in the liquid state under conditions of operation, said fatty acid esters being derived from lower fatty acids.

17. A process for the conversion of an unsaturated oxy compound to a valuable carbonylic compound which comprises heating an unsaturated compound of the general formula R—O—X, wherein R represents an organic radical comprising an alkyl chain containing an olefinic linkage embracing an aliphatic tertiary carbon atom not more than once removed from a saturated carbon of said chain which is linked to the oxygen atom and X represents hydrogen, an alkyl radical linked to the oxygen atom by a saturated carbon atom, or the group

wherein R' represents hydrogen or lower alkyl radicals, with a mineral acid-acting catalyst in a liquid system containing a liquid organic solvent for said catalyst.

18. A process for the conversion of an unsaturated oxy compound to a valuable carbonylic compound which comprises heating an unsaturated compound of the general formula R—O—X, wherein R represents an alkyl radical comprising an alkyl chain containing an olefinic linkage which embraces an aliphatic tertiary carbon atom directly linked to a saturated carbon atom which in turn is linked to the oxygen atom and X represents hydrogen, an organic radical linked to the oxygen atom by a saturated carbon atom, or the group

wherein R' represents hydrogen or lower alkyl radicals, with a mineral acid catalyst in a liquid system containing a liquid organic solvent for said catalyst.

19. A process for the conversion of an unsaturated oxy compound to a valuable carbonylic compound which comprises heating an unsaturated compound of the general formula R—O—X, wherein R represents an organic radical comprising an alkyl chain containing an olefinic linkage and linked to the oxygen atom by a saturated carbon atom of said chain and X represents an alkyl radical linked to the oxygen atom by a saturated carbon atom, or the group

wherein R' represents hydrogen or lower alkyl radicals, with a mineral acid catalyst in an aqueous liquid system.

20. A process for the conversion of an unsaturated oxy compound to a valuable carbonylic compound which comprises heating an unsaturated compound of the general formula R—O—X, wherein R represents an alkyl radical comprising an alkyl chain containing an olefinic linkage embracing an aliphatic tertiary carbon atom and linked to the oxygen atom by a saturated carbon atom and X represents an organic radical linked to the oxygen atom by a saturated carbon atom, or the group

—C—R'
‖
O wherein R' represents hydrogen or lower alkyl radicals, with a mineral acid-acting catalyst in a substantially anhydrous liquid system containing a liquid organic solvent for said catalyst.

21. A process for the conversion of an unsaturated oxy compound to a valuable carbonylic compound which comprises heating an unsaturated compound of the general formula R—O—X, wherein R represents an organic radical comprising an unsaturated alkyl chain containing an olefinic linkage between two aliphatic carbon atoms and wherein a carbon atom once removed from a saturated carbon atom linked to the oxygen atom is linked to a substituent of the class consisting of the hydroxyl group and halogen atoms and X represents hydrogen, an alkyl radical linked to the oxygen atom by a saturated carbon atom, or the group

wherein R' represents hydrogen or lower alkyl radicals, with a mineral acid-acting catalyst in a liquid system containing an organic solvent for said catalyst.

22. A process for the conversion of an unsaturated oxy compound to a valuable carbonylic compound which comprises heating an unsaturated compound of the general formula R—O—X, wherein R represents an organic radical comprising an alkyl chain containing an olefinic linkage between two aliphatic carbon atoms at least one of which is tertiary and linked to a saturated carbon atom linked to the oxygen atom and to a carbon atom linked to a substituent of the class consisting of the hydroxyl group and halogen atoms and X represents hydrogen, an alkyl radical linked to the oxygen atom by a saturated carbon atom, or the group

wherein R' represents hydrogen or lower alkyl radicals, with a mineral acid-acting catalyst in an aqueous liquid system containing a liquid organic solvent for said catalyst.

23. A process for the conversion of an unsaturated oxy compound to a valuable carbonylic compound which comprises heating an unsaturated compound of the general formula R—O—X, wherein R represents an alkyl radical comprising an alkyl chain containing an olefinic linkage embracing an aliphatic tertiary carbon atom and linked to the oxygen atom by a saturated carbon atom and X represents an organic radical linked to the oxygen atom by a saturated carbon atom, or the group

wherein R' represents hydrogen or lower alkyl radicals, with a mineral acid-acting catalyst in an aqueous liquid system.

HERBERT P. A. GROLL.
GEORGE HEARNE.